US009397567B2

(12) United States Patent
Searles et al.

(10) Patent No.: US 9,397,567 B2
(45) Date of Patent: Jul. 19, 2016

(54) SHUNT INTEGRATED VOLTAGE REGULATOR

(71) Applicant: Apple Inc., Cupertino, CA (US)

(72) Inventors: Shawn Searles, Austin, TX (US); Emerson S Fang, Fremont, CA (US)

(73) Assignee: Apple Inc., Cupertino, CA (US)

(*) Notice: Subject to any disclaimer, the term of this patent is extended or adjusted under 35 U.S.C. 154(b) by 66 days.

(21) Appl. No.: 14/287,931

(22) Filed: May 27, 2014

(65) Prior Publication Data

US 2015/0222182 A1 Aug. 6, 2015

Related U.S. Application Data

(60) Provisional application No. 61/936,139, filed on Feb. 5, 2014.

(51) Int. Cl.
*G05F 1/10* (2006.01)
*H02M 3/158* (2006.01)
*H02M 1/088* (2006.01)

(52) U.S. Cl.
CPC .............. *H02M 3/158* (2013.01); *H02M 1/088* (2013.01); *H02M 3/1588* (2013.01); *Y02B 70/1466* (2013.01)

(58) Field of Classification Search
CPC ........ H02M 3/157; G06F 1/3243; G06F 1/26; G06F 1/3234
See application file for complete search history.

(56) References Cited

U.S. PATENT DOCUMENTS 7,642,672 B2 1/2010 Strauss
7,848,123 B2 12/2010 Hess
8,645,886 B2 2/2014 Abhishek et al.
2004/0064747 A1* 4/2004 Haider ...................... G06F 1/26
713/330

(Continued)

FOREIGN PATENT DOCUMENTS

EP 2568593 A2 3/2013
TW 200945746 A1 11/2009

(Continued)

OTHER PUBLICATIONS

Search Report and Written Opinion in application No. PCT/US2015/010733 mailed Apr. 14, 2015.

(Continued)

*Primary Examiner* — Sibin Chen
(74) *Attorney, Agent, or Firm* — Meyertons, Hood, Kivlin, Kowert & Goetzel, P.C.; Erik A. Heter

(57) ABSTRACT

A method and apparatus for augmenting an external voltage regulator with a shunt integrated voltage regulator is disclosed. In one embodiment, an integrated circuit (IC) includes a load circuit coupled to a supply voltage node. The supply voltage node is electrically coupled to receive a supply voltage from an external voltage regulator. The IC also includes a shunt integrated voltage regulator coupled to the supply voltage node and implemented on the same IC die as the load circuit. If the supply voltage falls below a specified value (e.g., to increased current demand), the integrated voltage regulator may begin supplying current to the load. This may cause the supply voltage to return to within its specified range of the specified value, while allowing the external voltage regulator sufficient time to respond to the increased current demand. Thus, voltage droops on the supply voltage node may be minimized.

20 Claims, 9 Drawing Sheets

(56) References Cited

U.S. PATENT DOCUMENTS

| | | | |
|---|---|---|---|
| 2009/0121695 A1* | 5/2009 | Pierson | H02M 3/1584 323/283 |
| 2009/0190379 A1 | 7/2009 | Melanson et al. | |
| 2009/0243569 A1 | 10/2009 | Nguyen | |
| 2009/0322299 A1* | 12/2009 | Michishita et al. | H02M 3/156 323/282 |
| 2012/0217946 A1 | 8/2012 | Ju | |
| 2013/0009557 A1 | 1/2013 | Szczeszynski | |
| 2013/0114338 A1 | 5/2013 | Park | |
| 2013/0250636 A1 | 9/2013 | Arimura | |

FOREIGN PATENT DOCUMENTS

| | | |
|---|---|---|
| TW | 201315114 A1 | 4/2013 |
| WO | 2012074967 | 7/2012 |

OTHER PUBLICATIONS

Office Action, ROC (Taiwan) Application No. 104103456, mailed May 11, 2016, 4 pages.

Office Action, ROC (Taiwan) Application No. 104103456, mailed May 11, 2016, translated, 4 pages.

* cited by examiner

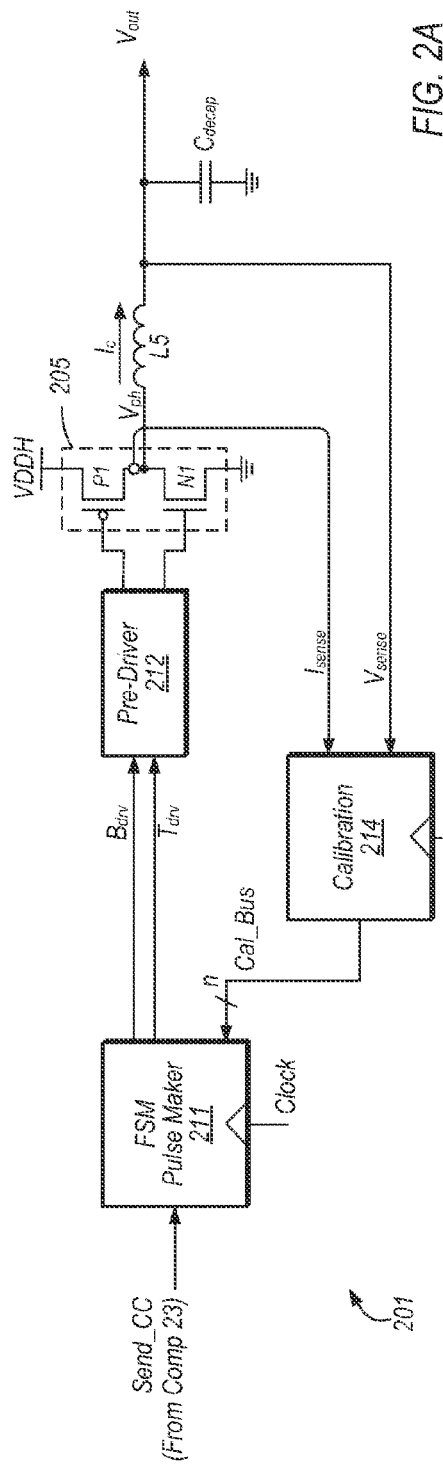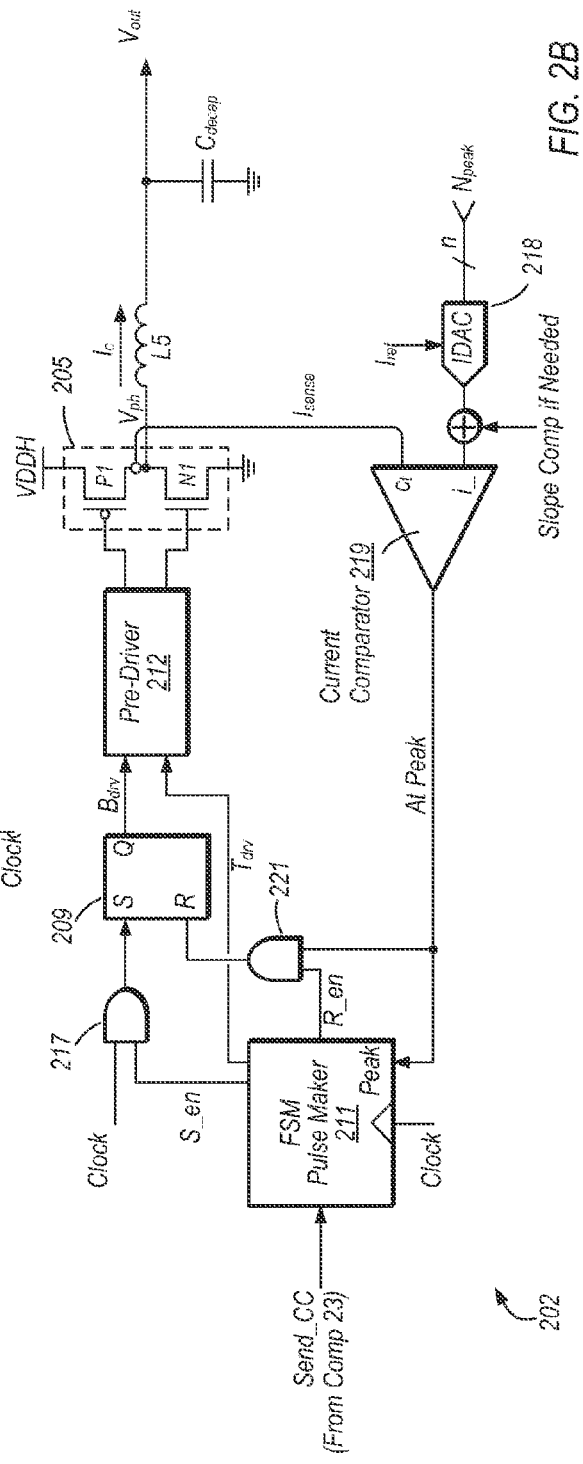
FIG. 2A
FIG. 2B

SHUNT INTEGRATED VOLTAGE REGULATOR

PRIORITY INFORMATION

This application claims priority to U.S. provisional patent application Ser. No. 61/936,139, entitled "Shunt Integrated Voltage Regulator", filed Feb. 5, 2014, and which is hereby incorporated by reference in its entirety as though fully and completely set forth herein.

BACKGROUND

1. Technical Field

This disclosure is directed to electronic circuits, and more particularly, to voltage regulators for distributing power to integrated circuits.

2. Description of the Related Art

A voltage regulator is a circuit that receives a source voltage and provides a regulated output voltage to a load circuit (i.e., the circuit which consumes the power provided by the regulator). More particularly, the circuit is intended to provide the output voltage at a specified value, with variation being within a specified range.

Many different types of voltage regulators exist. One type is known as a linear regulator, which typically provide an output voltage that is lower than the input voltage. The input current and output current are substantially equal for a linear voltage regulator. Because of the substantially equal input and output currents, linear regulators consume a significant amount of power compared to the amount delivered to the load circuit, and thus extra power is wasted.

Switching regulators are another type of commonly used voltage regulator. A switching regulator may receive a DC (direct current) input voltage, and provide a DC output voltage in a number of different phases. Each phase may correspond to an inductor, with each inductor coupled to an output node of the regulator. In an exemplary switching regulator, the output voltage may be provided through a first inductor for a portion of a cycle, then through a second inductor, and so forth. Switching circuitry within the regulator may switch from one inductor to the next to convey the output voltage to the output node. Switching regulators are typically more power efficient than linear regulators, as they can be designed such that the output power is substantially equal to the input power.

Switching regulators may also be implemented as boost regulators or buck regulators. In a boost regulator, the output voltage provided may be greater than the input voltage received, with the input current being greater than the output current. Conversely, in a buck regulator, the output voltage may be less than the input voltage, with the output current being greater than the input current.

SUMMARY

A method and apparatus for augmenting an external voltage regulator with a shunt integrated voltage regulator is disclosed. In one embodiment, an integrated circuit (IC) includes a load circuit coupled to a supply voltage node. The supply voltage node is electrically coupled to receive a supply voltage from an external voltage regulator. The IC also includes a shunt integrated voltage regulator coupled to the supply voltage node and implemented on the same IC die as the load circuit. When the external voltage regulator is supplying the supply voltage within a specified range of a specified value, the integrated voltage regulator may be inactive. However, if the supply voltage falls below a specified value (e.g., responsive to a sudden increase in current demand from the load circuit), the integrated voltage regulator may begin supplying current to the load. This may cause the supply voltage to return to within its specified range of the specified value, while allowing the external voltage regulator sufficient time to respond to the increased current demand. Thus, voltage droops on the supply voltage node may be minimized.

In one embodiment, a method includes an external voltage regulator providing a supply voltage to a supply voltage node on an IC. The method further includes monitoring the voltage on the supply node. The IC includes a second voltage regulator integrated thereon, arranged in a shunt configuration with the external voltage regulator (i.e., the output of the internal voltage regulator is also coupled to the supply voltage node on the IC). If the voltage on the supply node falls below a threshold level (e.g., due to a rapid increase in current demand from the load circuit), the integrated voltage regulator may begin providing current to the load circuit via the supply voltage node. This may minimize the magnitude and duration of any voltage droop on the supply voltage node. Current may be provided by the integrated voltage regulator for a duration sufficient to allow the external voltage regulator to respond to changing conditions on the load. The integrated voltage regulator may cease providing current to the load at some point in time subsequent to the conditions that triggered it to begin providing current.

BRIEF DESCRIPTION OF THE DRAWINGS

The following detailed description makes reference to the accompanying drawings, which are now briefly described.

FIGS. 2A and 2B are diagrams illustrating different embodiments of pulse generating circuitry used in one embodiment of an integrated voltage regulator.

Figure 1:
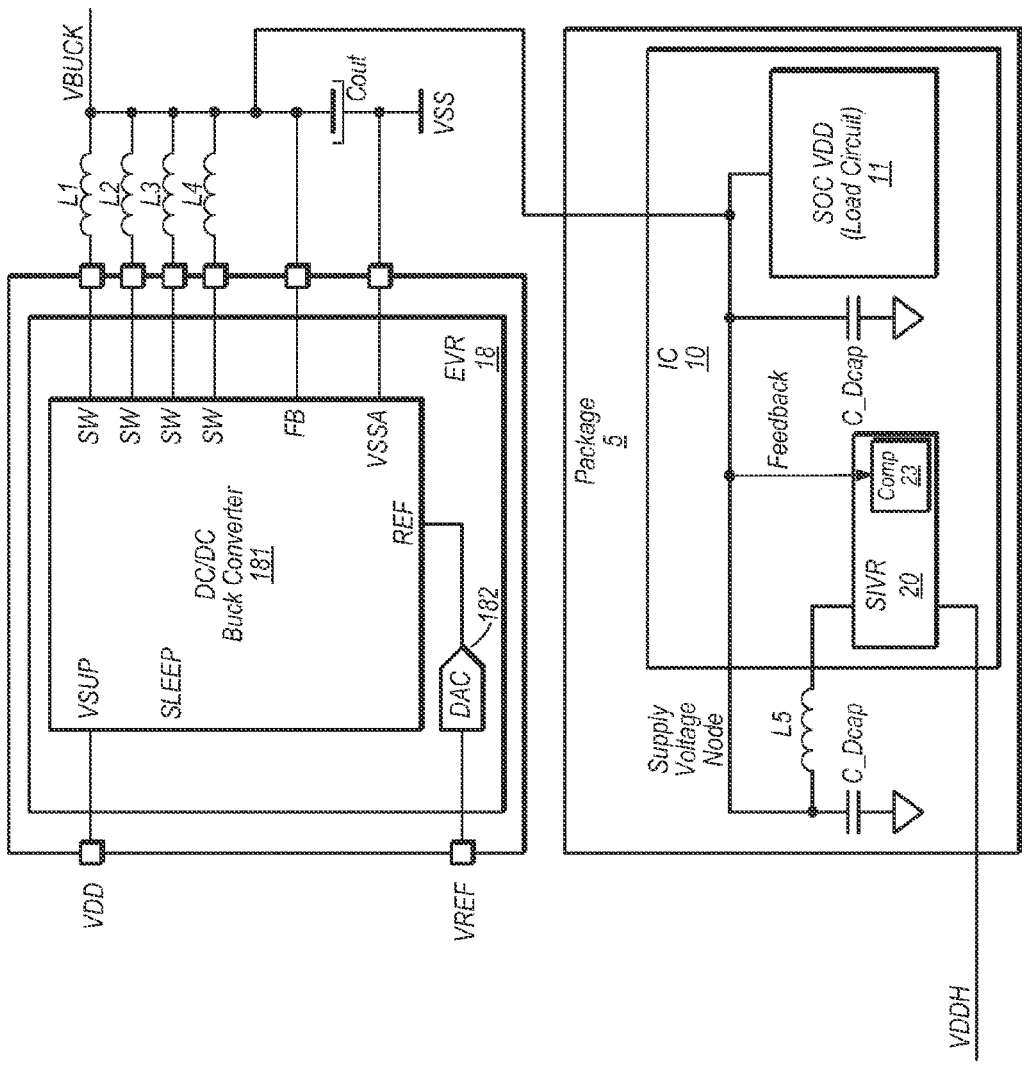
FIG. 1 is a block diagram of one embodiment of a system including an external voltage regulator coupled to an integrated circuit (IC).

While the disclosed subject matter is susceptible to various modifications and alternative forms, specific embodiments thereof are shown by way of example in the drawings and will herein be described in detail. It should be understood, however, that the drawings and detailed description thereto are not intended to limit the subject matter to the particular form disclosed, but on the contrary, the intention is to cover all modifications, equivalents and alternatives falling within the spirit and scope of the disclosed subject matter as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component.

DETAILED DESCRIPTION OF EMBODIMENTS

The present disclosure is directed toward a shunt integrated voltage regulator implemented on an IC and used in conjunction with an external voltage regulator. The supply voltage provided to a load circuit (e.g., a system on a chip, or SOC) on the IC may be provided via a supply voltage node, to which outputs of both the external and integrated voltage regulators are coupled. During operation, the external voltage regulator is used as the primary source of power for the load circuit, with the integrated voltage regulator used to augment the external voltage regulator.

External voltage regulators (EVR's) typically have good efficiency. However, external voltage regulators may also suffer from long latency in responding to changing conditions on the load circuit. For example, an external voltage regulator may not be able to timely respond to a sudden increase in current demand by the load circuit, which may result in a voltage droop. External voltage regulators may also be limited by volumetric capacitance requirements and placement distance requirements.

Integrated voltage regulators (IVR's), given their proximity to the load circuit, may have significantly better latency characteristics than EVR's. Using the same example as above, an IVR may respond quicker to a sudden increase in current demand by the load circuit, and in many cases may avoid voltage droops that might occur with an EVR. However, an IVR typically has significantly tighter requirements regarding capacitance and magnetics than an EVR, thus complicating their design and implementation.

Thus, in the present disclosure, an IVR is used to augment an EVR. The currents output from both the EVR and IVR are shorted in parallel (shunted). The EVR may be used as the primary source of power for the load circuit implemented on the same IC die as the IVR. However, the IVR may respond to changing load conditions such as rapidly increasing current demands by supplying additional current to the load that may prevent or at least reduce the duration and magnitude of voltage droops. The additional current may be supplied by the IVR for a duration sufficient to allow the EVR to respond to the changing load conditions. When the EVR is providing power within a specified tolerance (e.g., 1.0 volt, ±5%), the shunt IVR (SIVR) may be inactive, with no current provided to the supply voltage node.

Augmenting the EVR with the SIVR may result in less stringent design requirements for both circuits. However, as will be apparent to those skilled in the art, implementing the SIVR to augment the EVR may result in additional design considerations that are not otherwise present when using only an EVR or an IVR.

Turning now to FIG. 1, a block diagram of one embodiment of a system including an IC and an EVR is shown. In the embodiment shown, EVR 18 is coupled to a supply voltage node on IC 10, the latter of which is implemented in package 5. EVR 18 in the embodiment shown includes a four-phase DC-DC buck converter 181 (one phase output per each of inductors L1-L4). It is noted however that the disclosure is not limited to DC-DC buck converter type voltage regulators. On the contrary, the disclosure may be implemented with virtually any type of circuitry or source suitable for use as an external voltage source for an IC.

IC 10 in the embodiment shown is implemented on package 5, which may be any type of package suitable for containing an IC. Package 5 also includes decoupling capacitance, shown here as various instances of C_Dcap. One or more inductances may also be implemented within package 5, with L5 being a representative instance.

The supply voltage provided from DC-DC buck converter 181 in the embodiment shown may be based on a reference voltage input. In the embodiment shown, the reference voltage is provided as a digital word to digital-to-analog converter (DAC) 182. The digital word may be converted into an analog voltage and provided to the reference voltage input (REF) of DC-DC buck converter 181. DC-DC buck converter 181 may also receive an input voltage through the VSUP input. The input voltage may be provided from a battery or other source external to EVR 18.

DC-DC buck converter 181 in the embodiment shown also includes a feedback input (FB) coupled to the supply voltage node. Circuitry within DC-DC buck converter 181 (not shown here) may use this feedback to respond to changes in current demand.

IC 10 in the embodiment shown includes system-on-a-chip (SOC) 11, which is the load circuit to which power is provided via the supply voltage node. SOC 11 may include a number of different circuits therein, such as general purpose processors, graphics processors, memory arrays, input/output (I/O) circuits, and so forth.

SIVR 20 in the embodiment shown includes an output coupled to the supply voltage node. Although only a single inductor L5 is shown in this particular drawing, it is noted that SIVR 20 may also be implemented as a multi-phase (e.g., four) DC-DC converter, and thus multiple inductors may be coupled to the output node. SIVR 20 in the embodiment shown may receive power (VDDH) from another source that is off-chip (and may also be off-package). The source from which SIVR 20 receives power may be another EVR, a battery, or other suitable source. It is noted that if the power source for SIVR 20 is another EVR, the regulation requirements for the latter may be relatively loose. SIVR 20 in the embodiment shown is configured to provide an output current at substantially the same voltage as EVR 18.

During operation of SOC 11, EVR 18 serves as the primary power source. When load conditions are relatively stable over a significant duration, current drawn by SOC 11 may be supplied by EVR 18 at a specified voltage. However, when the demand for current by SOC 11 increases rapidly such that EVR 18 is unable to timely respond to the change, SIVR 20 may become active. SIVR 20 may provide current to meet the demand by SOC 11 while also reducing any voltage droops on the supply voltage node that might otherwise occur.

In the embodiment shown, SIVR 20 includes a comparator circuit 23. Comparator circuit 23 may in one embodiment compare the voltage present on the supply voltage node to a threshold voltage. If the voltage on the supply voltage node falls below the threshold voltage, the comparator circuit 23 may generate one or more indications that may cause generation of current by SIVR 20 to augment that supplied by EVR 18. The falling of the voltage on the supply node may be a voltage droop caused by a change in the current demanded by SOC 11. The current provided by SIVR 20 may reduce the amount of voltage droop, and may even cause the supply voltage to remain within specified tolerance limits. SIVR 20 may continue to provide for a duration that allows for EVR 18 to adequately respond to the changing current demand. The duration for which SIVR 20 provides current to the supply voltage node (and thus to SOC 11) may be predetermined in some embodiments, although this is not necessarily the case for all embodiments.

In other embodiments, rather than comparing the supply voltage to a threshold voltage, comparator 23 may determine a rate of voltage change over some specified duration, and may cause SIVR 20 to provide current to SOC 11 based on this rate of change. In yet another embodiment, comparator circuit 23 may use multiple parameters (e.g., both the supply voltage and rate of change thereof) to determine whether SIVR 20 is to provide current to SOC 11.

In general, any suitable circuitry may be used to determine the occurrence of a rapid increase in current demanded by SOC 11. The circuitry may then provide an indication to SIVR 20, causing its activation and thus the providing of additional current therefrom on the supply voltage node. SIVR 20 may provide the additional current for a finite time that allows EVR 18 to fully respond to the changing demands of SOC 11.

It is noted that only a single instance of SIVR 20 is shown in FIG. 1. However, the disclosure is not limited to a single instance. In many ICs, multiple power domains may be implemented, each operating on a supply voltage that is different with respect to the others. Accordingly, multiple instances of SIVR 20 may be implemented. Additionally, multiple instances of EVR 18 may also be implemented.

FIGS. 2A and 2B are diagrams respectively illustrating different embodiments of pulse generating circuitry used in one embodiment of an integrated voltage regulator. Either of pulse generating circuits 201 and 202 may be used to implement SIVR 20. Each pulse generating circuit may generate a series of pulses that are provided to the supply voltage node via the output node of the circuits (shown as Vout in both) in order to supply current to SOC 11.

The pulses may be generated by a given embodiment of a pulse generating circuit 201 or 202 may be accomplished through corresponding driver circuits 205. It is noted that in each of the embodiments shown, only a single driver circuit 205 (and corresponding inductor) is shown for the sake of simplicity. However, as noted above, since SIVR 20 may be implemented as a multi-phase DC-DC converter, multiple instances of driver circuit 205 and correspondingly coupled inductors may be present in each, with one instance per phase. For example, if SIVR 20 is implemented as a four phase DC-DC converter, four instances of driver circuit 205 and corresponding inductor coupled to the output thereof may be present.

Each driver circuit 205 includes a PMOS transistor coupled to a voltage node (e.g., Vddh) and an NMOS transistor coupled to a ground node, with both transistors coupled to each other at a driver output node (Vph) in both. As shown here, an inductor L5 (implemented in package 5) is coupled between the driver output node and the output node of the circuit, which is the supply voltage node. A pre-driver circuit 212 is coupled to the gate terminals of each of the PMOS and NMOS transistors (P1 and N1, respectively). The pre-driver circuit may alternately activate the PMOS and NMOS transistors, one at a time. When the PMOS transistor is activated, the driver output node Vph is pulled up toward Vddh. When the NMOS transistor is activated, the driver output node Vph is pulled down toward ground. The pre-driver circuit 212 may activate or deactivate the PMOS and NMOS transistors based on the Bdrv and Tdrv signals received from the finite state machine (FSM) 211. At any given instant, the state of the driver output node, Vph, may be determined in this embodiment by the Bdrv and Tdrv signals, based on the following truth table.

In one embodiment,

| Bdrv | Tdrv | Vph |
|------|------|-----------|
| 0 | 0 | =gnd |
| 1 | 0 | =Vddh |
| 0 | 1 | =Tri-State |
| 1 | 1 | =Tri-State | the FSM 211 may output the Bdrv and Tdrv signals to the pre-driver circuit 212 in a manner that causes generation of the pulses that result in current being provided on the supply voltage node. Each pulse may include a series of triangular wave pulses, which may be the result of corresponding square wave pulses generated on the driver output node Vph. When a square wave is generated on node Vph, a triangle wave is generated on the output node Vout (the supply voltage node) since the inductor does not allow for an instantaneous change in current. Each pulse, and thus the triangular pulses thereof, may be generated in such a manner to provide a desired average current value at a suitable ratio relative to the peak current. An exemplary pulse and explanation thereof is explained in further detail below with respect to FIG. 6.

The FSM 211 in the embodiments shown is configured to begin generating pulses responsive to receiving the Send_CC signal, which may be received from comparator circuit 23. Operation of the FSM 211 relative to one instance of the pulse generating circuit is further discussed below in reference to the state diagram shown in FIG. 7.

As previously noted, SIVR 20 may be implemented as a multi-phase converter. In some embodiment, a single instance of FSM 211 may be implemented, with the single instance of FSM 211 controlling a corresponding pre-driver circuit 212 and driver 205 for each phase. In another embodiment, separate instances of FSM 211, one per phase, may be implemented.

The embodiment of the pulse generating circuitry shown in FIG. 2A (201) includes a calibration circuit 214 which is coupled to provide information to the FSM 211. The calibration circuit 214 is coupled to receive a current signal (ISense) from the driver output Vph and a voltage signal (VSense) from the output node Vout. Based on the values of these signals, the calibration circuit 214 may generate information sent over the calibration bus (Cal_Bus) to be used in generating the train of triangular pulses. The information generated by the calibration circuit 214 in this embodiment includes a count value (indicating the number of pulse counts), the number of counts to ramp up to the peak current, the time to count up during a triangular portion of a pulse (after initial ramp up), the time to count down during the triangular portion of the pulse (also after initial ramp up), and the number of counts to ramp back down to zero current from the peak current. Using this information, the FSM 211 may cause a pulse to be generated for a desired width at desired values of a peak current and average current. This current may be received by the load circuit via the supply voltage node, and may make up for any deficiency in current from EVR 18 when it is unable to immediately respond to an increased demand for current. SIVR 20 may generate a series of such pulses using one or more instances of pulse generating circuit 201.

The other embodiment of the pulse generating circuitry shown in FIG. 2B (202) does not include the calibration circuitry, and thus does not compute the various values discussed in the previous paragraph. Instead, a current comparator 219 controls the ramping of current up to the peak current. After the current is ramped up, the triangles of the pulse may be generated in accordance with the clock signal until the ramp down to zero at the end of the pulse.

The value Npeak is a n-bit digital control signal that uses the IDAC (current digital to analog converter) to select a peak current, Ipeak. This digital control signal may be received from a register or other storage unit within or external to SIVR 20. Isense is the real time current that tracks the sending of current into the inductor by the PMOS transistor P1. When Isense is greater than or equal to Ipeak, the signal AtPeak is generated by the current comparator, and the FSM may cause assertion of the reset R on the SR latch 209 (via AND gate 221), which also is also coupled to receive the enable signal R_en from FSM 211 in this embodiment). This may in turn cause NMOS transistor N1 to be turned on and PMOS transistors P1 turned off (assuming Tdrv de-asserted). At some point after the current ISense falls below the IPeak value, the FSM 211 may cause assertion of the Set S on the SR latch via AND gate 217. AND gate 217 is coupled to receive a clock signal and the enable signal S_en from FSM 211. When SR latch 209 is set responsive to a high output from AND gate 217, the Bdrv signal is asserted, and thus pre-driver causes PMOS transistor P1 to be turned on and NMOS transistor N1 to be turned off (assuming Tdrv is de-asserted). This cycle may repeated until the time the circuit ramps the current back down to zero responsive to assertion of the Tdrv signal by FSM 211. When FSM 211 asserts the Tdrv signal, both the PMOS and NMOS transistors P1 and N1 are turned off and thus the driver output node Vph is tri-stated. Upon tri-stating of the driver output node, the current thereon may fall back to zero before the next pulse is generated. FSM 211 may also cause the tri-stating of the driver output node when no current is to be provided by SIVR 20.

Figure 3:
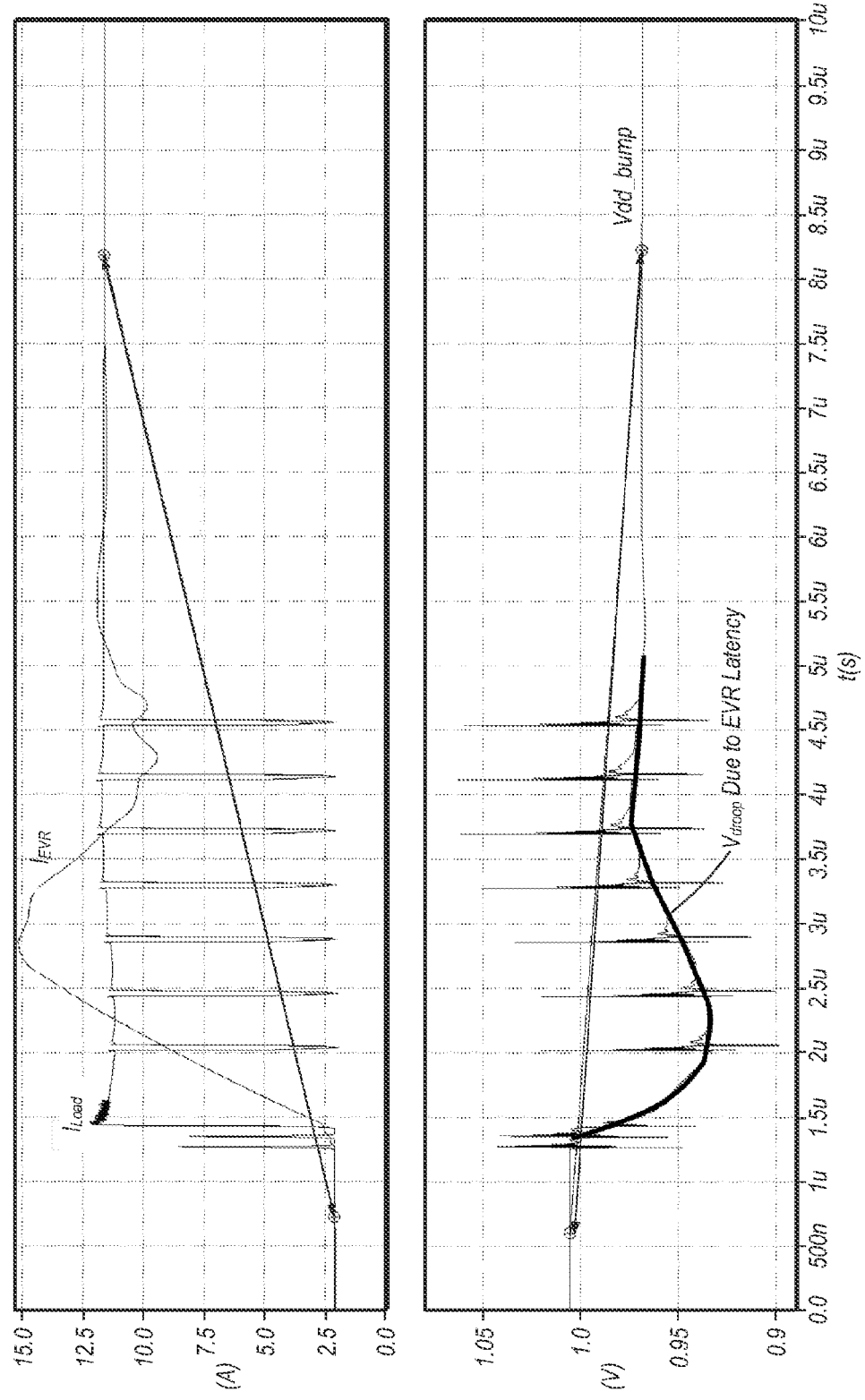
FIG. 3 is a graphic illustration of the operation of one embodiment of an external voltage regulator without augmentation by an internal voltage regulator.

FIG. 3 is a graphic illustration of the operation of one embodiment of EVR without augmentation by an SIVR. In the illustrated example, two graphs are shown. The upper graph illustrates a sudden increase in current by the load ($I_{Load}$) and the corresponding increase in current provided by the EVR ($I_{EVR}$). As can be seen in the graph, the response of the EVR is much slower than the increase in current demanded by the load. Thus, as shown in the lower graph, the EVR latency in responding to the increased current demand results in a voltage droop as shown. This voltage droop is undesirable, as the supply voltage may fall below lower tolerance limits. This in turn can cause malfunctioning of circuitry within the load circuit.

Figure 4:
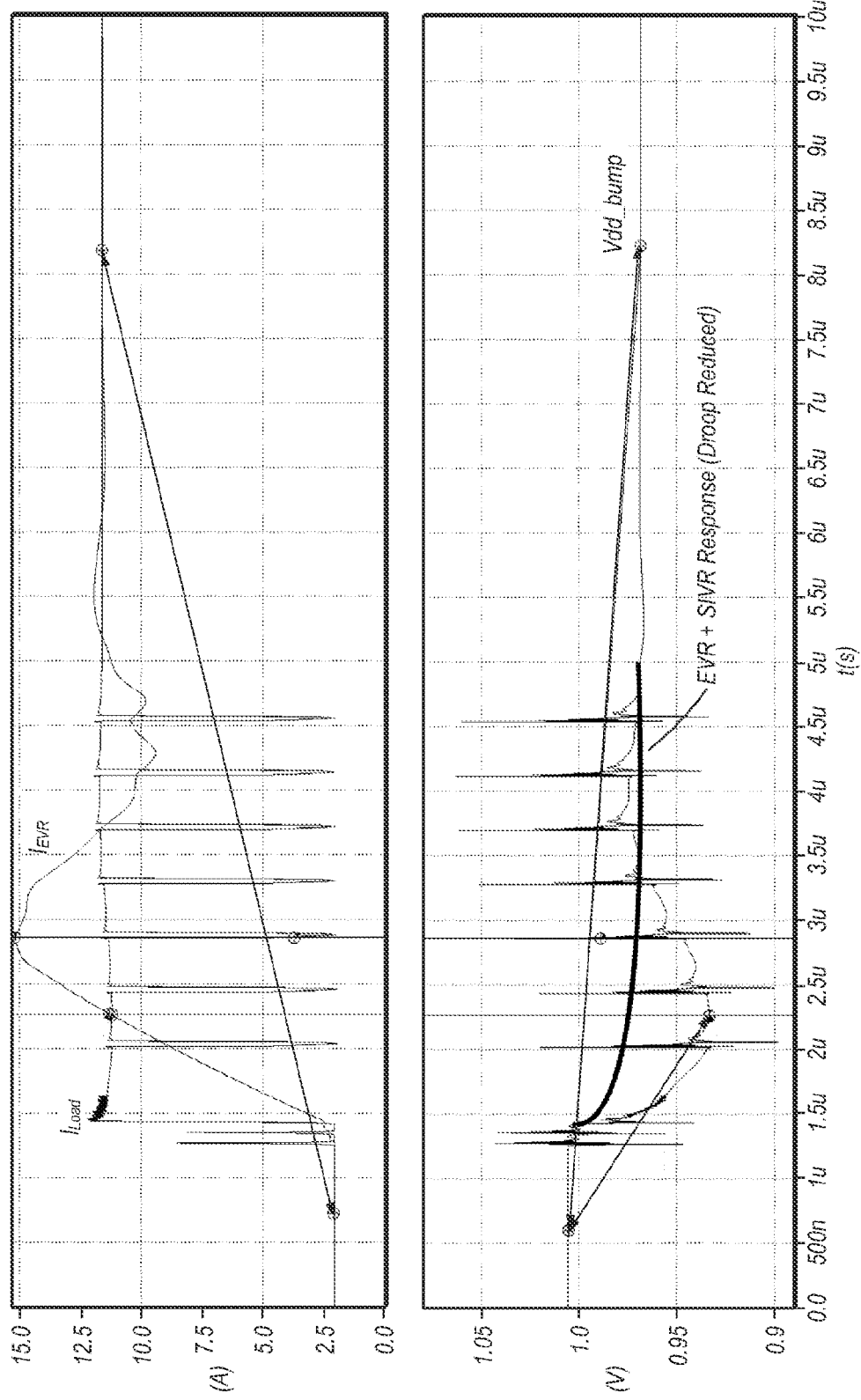
FIG. 4 is a graphic illustration of the operation of one embodiment of a system having an external voltage regulator and an IC with an integrated voltage regulator.

Since the SIVR may have lower latency for responding to a rapid increase in load current demand, it may be used to fill in the current gap caused by the higher latency of the EVR as shown in FIG. 3. This in turn may reduce the amount of voltage droop. This is illustrated in FIG. 4, which is a graphic illustration of the operation of one embodiment of a system having an EVR and an IC with an SIVR. The upper graph illustrates the same current response as its counterpart in FIG. 3. As shown in the lower graph of FIG. 4, the increased current demand may still result in a voltage droop. However, the magnitude of the voltage droop may be significantly less due to the augmentation provided by the SIVR. In at least some instances, this may enable the supply voltage to be kept within tolerances despite the latency of the EVR.

Figure 5:
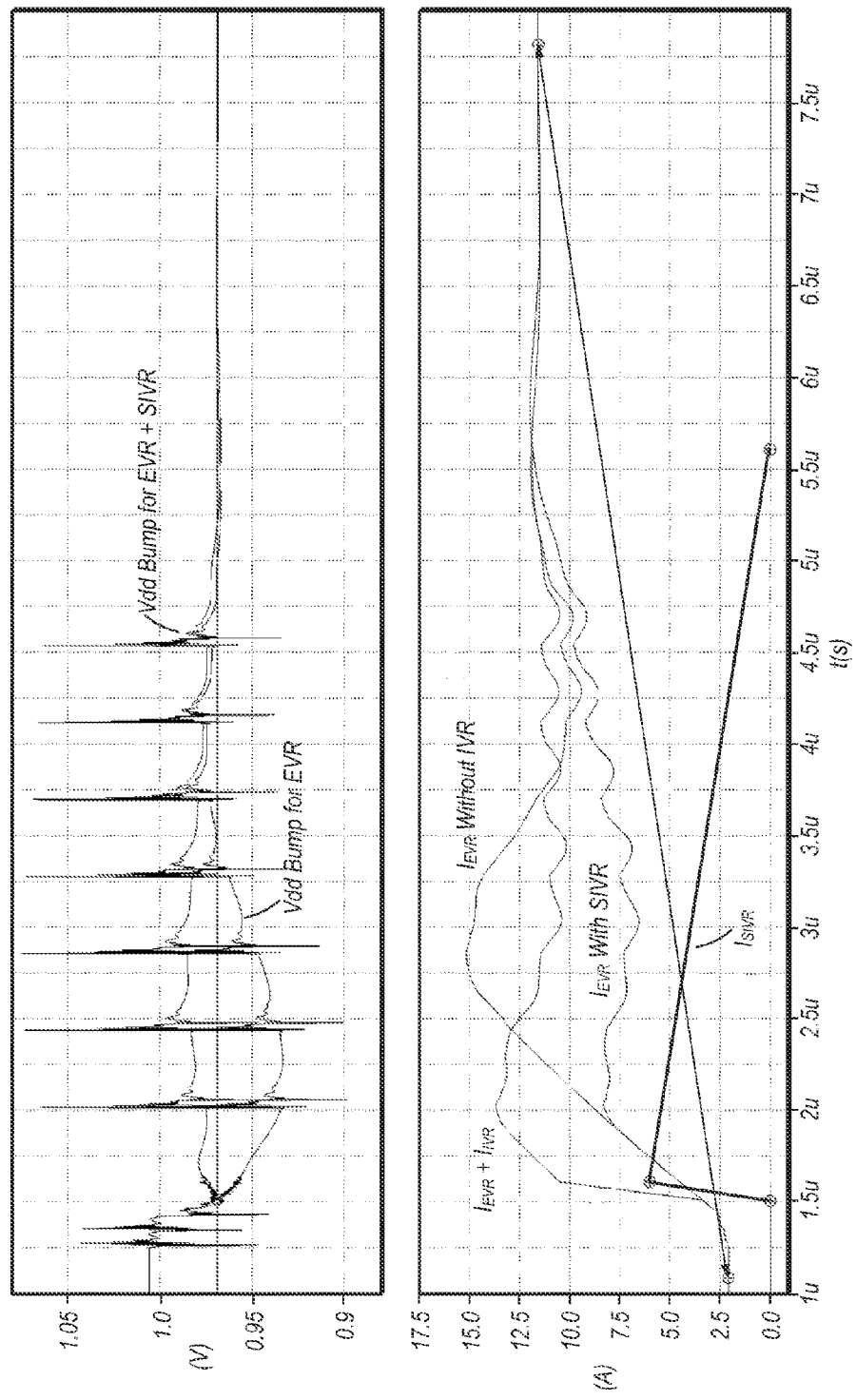
FIG. 5 is another graphic illustration of the operation of one embodiment of a system having an external voltage regulator and an IC with an integrated voltage regulator.

FIG. 5 is another graphic illustration of the operation of one embodiment of a system having an EVR and an IC with an SIVR. In the upper graph, another example of a change in voltage due to a rapid increase in current demand by the load circuit is shown. In the graph, the combined voltage Vdd for both the EVR and SIVR is shown, along with the contribution of the EVR separate from the SIVR is shown. As shown in the graphs, the EVR voltage falls and thus causes activation of the SIVR. Upon activation of the SIVR, the combined SIVR+EVR voltage arrests the voltage droop on the supply node, with the combined voltage settling to a stable value as the EVR responds to the increased load current demand.

In the bottom graph, the currents from the EVR, SIVR, and combined EVR/SIVR current are shown. The contribution of the SIVR to the overall current on the supply voltage node is indicated by the bolded triangle. As the voltage falls on the supply node and the SIVR is activated responsive thereto, its contribution to the current is rapidly ramped up (6 amps in 100 ns in this particular example, which is not intended to be limiting). The SIVR current then slowly ramps down to zero as the EVR responds.

The response of the EVR absent the SIVR, as shown in this graph as well as in FIGS. 3 and 4, is much slower than the ramp up of current from the SIVR. With augmentation from the SIVR, the rise of current from the EVR remains slow even with the presence of the SIVR, but does not reach the same peak level. Instead, the EVR current begins to level off sooner. Because of the rapid response of the SIVR, the combined current also rises rapidly. As the EVR responds to the change and the SIVR current ramps down, the combined current continues to stabilize until settling as the SIVR current returns to zero.

It is noted that the graphs shown in FIGS. 3-5 are exemplary, and not applicable to all embodiments of the method and apparatus disclosed herein. In contrast, a wide variety of embodiments are contemplated as falling within the scope of this disclosure, and their respective responses (including the specific voltage, current, and time values) may vary from what is shown in the examples discussed above.

Figure 6:
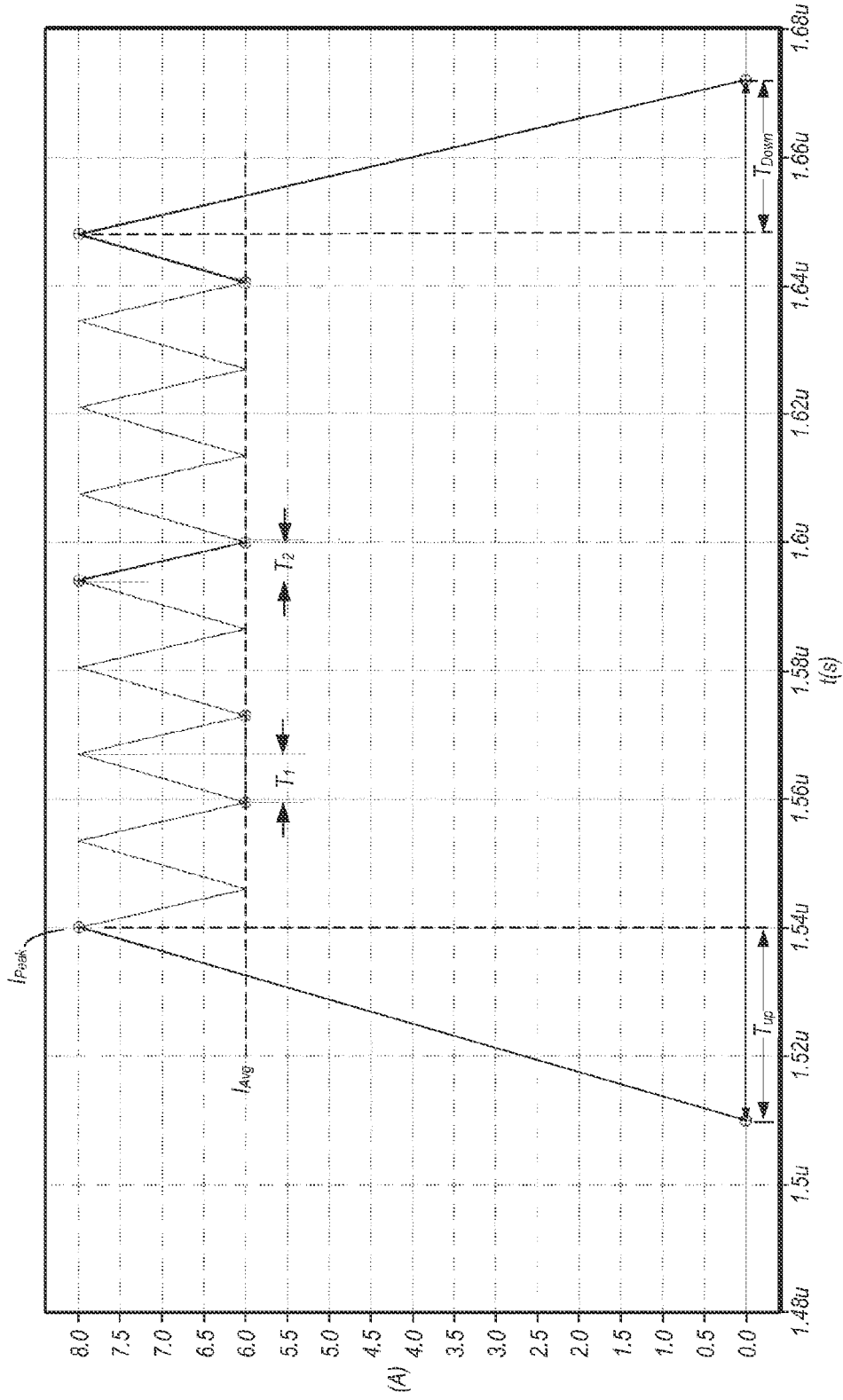
FIG. 6 is an illustration of a pulse generated by one embodiment of pulse generation circuitry used in an embodiment of an integrated voltage regulator.

FIG. 6 is an illustration of a pulse generated by one embodiment of pulse generation circuitry used in an embodiment of an integrated voltage regulator. As noted above, to generate the current from the SIVR, a series of pulses may be output from a pulse generating circuitry therein. In one embodiment, the generated pulses may look similar to the exemplary pulse shown in FIG. 6.

Prior to generation of the pulse, a driver circuit (e.g., driver circuit 205 in either of FIG. 2A or 2B) may be inactive, with both transistors thereof turned off and the output node thereof tri-stated. Generation of the pulse may begin with the activation of one of the transistors (e.g., the PMOS transistor), as the current ramps up from zero to a peak current, $I_{Peak}$ during a time $T_{up}$. After reaching the peak current, the other transistor (e.g., the NMOS transistor) is activated, while the transistor that was active during the current ramp up is deactivated. The current may then fall for a limited time. In this particular example, the current falls to the average current value, $I_{Avg}$, although this is not necessarily true for pulses generated in various embodiments. Thereafter, the active transistor may be turned off and the inactive transistor may be turned on, with the current beginning to rise again. The current may again rise to the peak current value in a time $T_1$. After reaching the peak current, the transistors are switched again, and the current falls for a time $T_2$. This cycle repeats itself a number of times until both transistors are deactivated. Thereafter, the current falls from the peak current to zero in a time $T_{Down}$.

It is desirable to limit the peak current, $I_{Peak}$, for a given amount of average current (Iavg) to be provided. For a single triangle-shaped pulse, the ratio $\beta=I_{Avg}/I_{Peak}$ is 0.5. This ratio may be undesirable since the peak current is twice the average current. In the example shown in FIG. 6, instead of using a single triangular pulse, the generated pulse includes a number of triangular peaks and valleys after an initial ramping up of current. To obtain a desired ratio of average current to peak current for a number of triangles within a pulse, the following formula may be used: $\beta=[N+1-\text{sqrt}(N+1)]/N$, wherein N is the number of downward slopes of time $T_2$. Alternatively, the value N may be considered to be the number of downward pointing triangles. N+1 in this case is the number of peaks or upward pointing triangles.

Using the example shown in FIG. 6, a value of N=8 results in $\beta=0.75$, and in this example, results in a peak current for each pulse of 8 A when average current for each pulse is 6 A. In general, the number N may be chosen in a manner to achieve a desired ratio of average to peak current for the resultant pulse.

The desired ratio of average to peak current may be chosen such to prevent the saturation of inductor with magnetic flux from a larger magnetic field. The magnetic field will saturate based on instantaneous peak current. Magnetic saturation can damage or destroy an inductor. Accordingly, the number N and resulting ratio $\beta$ may be chosen to limit the peak current to a value that that does not saturate the output inductor of the SIVR. However, it is also desirable to provide sufficient peak current to fill in the gap caused by the higher latency of the EVR. Furthermore, for higher bandwidth systems, it is desirable to have a lower number of triangles. Accordingly, in choosing a value of $\beta$ includes balancing desired bandwidth and desired average current while providing a peak current value that is sufficient to produce the average current while not saturating the output inductor of the SIVR.

The chosen pulses may be transmitted a number of times while the SIVR is actively providing current to the load circuit. If it is desired to achieve the triangular shape for $I_{SIVR}$ shown in FIG. 5, the interval between successive pulses may be increased as the overall current from the SIVR 20 is ramped down to zero. The pulses may be generated by successively switching a number of driver circuits such as those discussed above in reference to FIGS. 2A and 2B.

Figure 7:
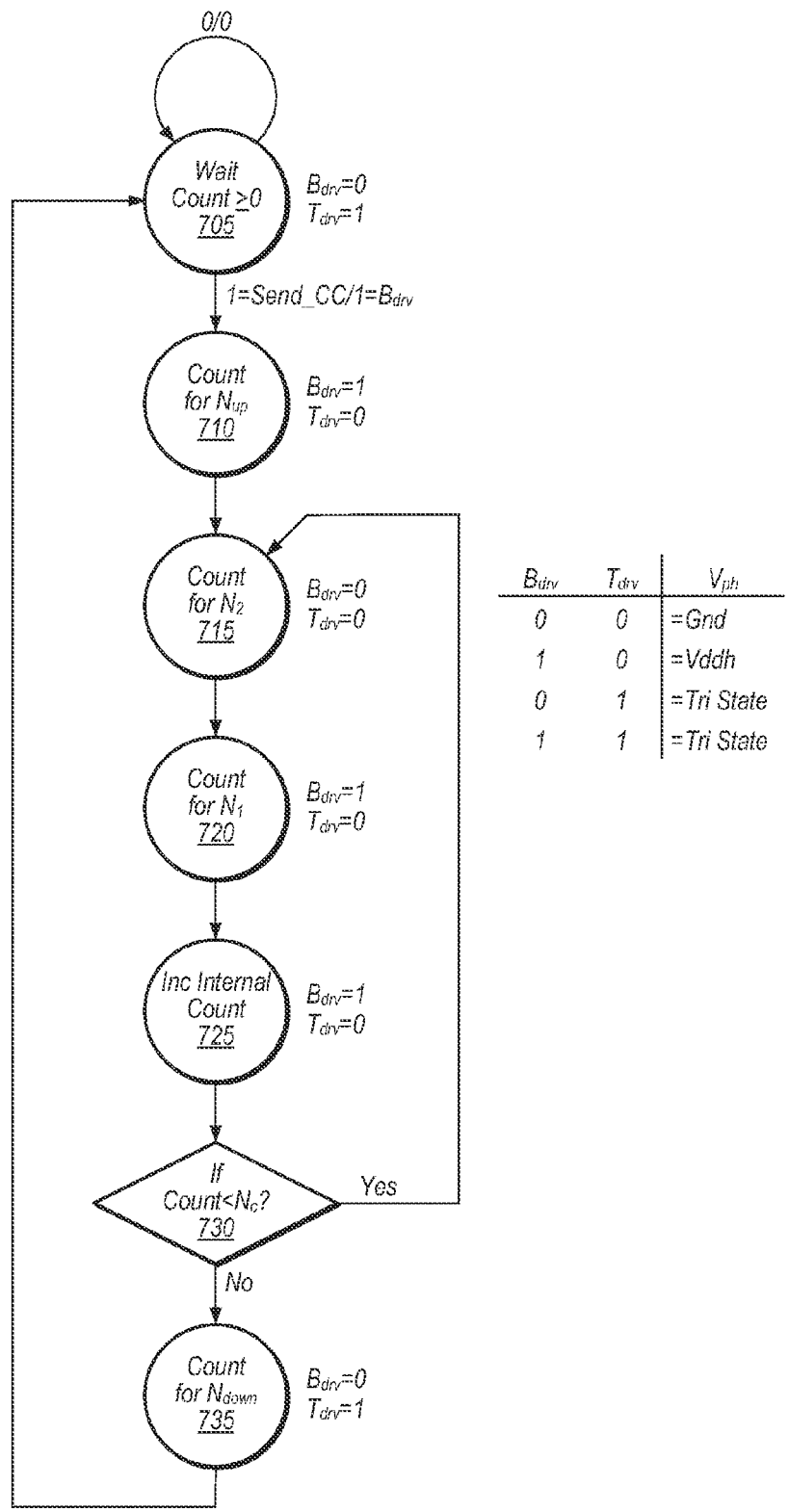
FIG. 7 is a state diagram illustrating the operation of one embodiment of pulse generation circuitry.

FIG. 7 is a state diagram illustrating the operation of one embodiment of pulse generation circuitry with a driver circuit. The state diagram here applies to one instance of a driver circuit, although it is understood that multiple instances of a driver circuit may be present in various embodiments of the pulse generating circuitry, and thus multiple instances of the state diagram may be performed concurrently in an overlapping manner. It is noted that the state diagram shown may be used with the embodiments of pulse generating circuitry shown above, as well as with other embodiments not explicitly discussed herein.

In state 705, the pulse generating circuitry is in a wait state, as the SIVR is inactive. The Tdrv signal is asserted as a logic 1 in this embodiment, and thus the driver circuit is tri-stated. When the Send_CC signal is received by the FSM, the Tdrv signal may be de-asserted and the Bdrv signal is asserted, causing activation of the PMOS transistor in a driver circuit (state 710). Counting for Nup is initiated, as the current is ramped up. The count for Nup is the time that current is allowed to ramp up from zero to its peak for the pulse. In state 715, a count for N2 is initiated, with Bdrv being de-asserted back to a logic 0. The count for N2 is the time that Bdrv is held low and thus current is on a downslope from its peak. It is noted that during this time, the NMOS transistor is active, since Vph is pulled toward ground whenever Bdriv is a logic 0 and Tdrv is also a logic 0. In state 720, Bdrv is asserted again for a count of N1, which is the time that current is on its upslope from the valley of a given triangle to the peak current. In 725, while Bdrv is still high, an internal counter increments a value of N, which is the number of triangles in a given pulse, as discussed above with reference to FIG. 6. In state 730, if the value of N is less than a value Nc (the number of triangles chosen for the pulse, shown as N in the formula discussed above), a transition is made back to state 715 and the cycle repeats. The cycle will continue until reaching a count of Nc. Once Nc is reached, a transition is made to state 735, with Bdrv de-asserted to a logic zero and the driver circuit tri-stated by asserting Tdrv to a logic 1. The current is ramped down to zero for a count of Ndown, and the method then returns to the wait state of 705.

Figure 8:
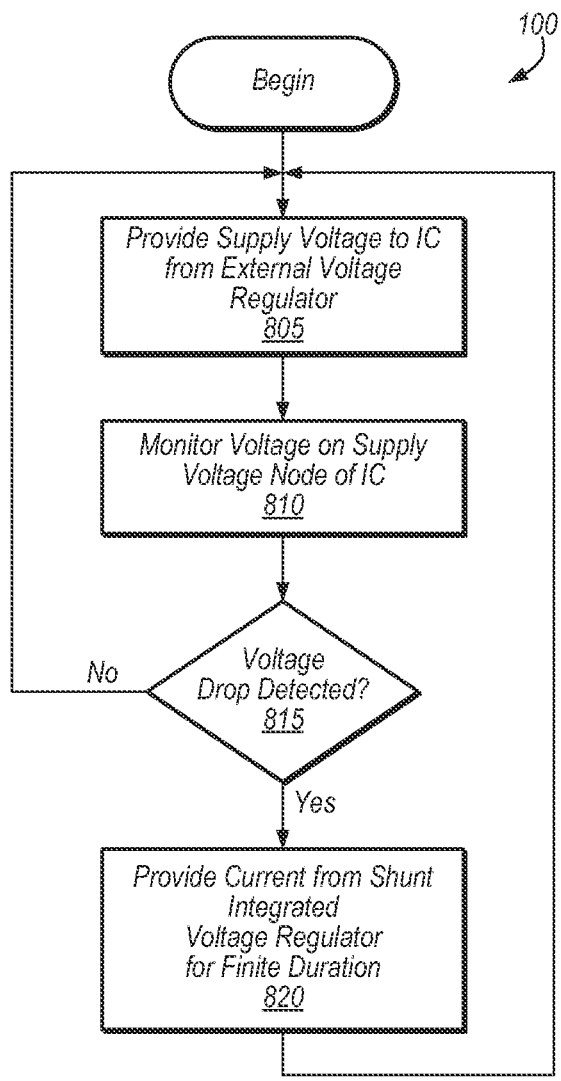
FIG. 8 is a flow diagram illustrating the operation of one embodiment of a system including an external voltage regulator and an integrated voltage regulator implemented on an IC.

FIG. 8 is a flow diagram of one embodiment of a method for operating an SIVR in conjunction with an EVR. Method 800 may be utilized with any of the hardware/circuit embodiments discussed above. Additionally, it is possible and contemplated that method 800 may be utilized by other hardware/circuit embodiments not discussed herein.

Method 800 begins with the providing of a supply voltage, to an IC from an EVR (block 805). The EVR may provide the supply voltage at various current values. The EVR attempts to provide the supply voltage at a specified value and within a specified tolerance, and at a current demanded by the load circuit. For relatively slow and/or small changes in the current demanded by the load, the EVR may be able to provide the current within the tolerance of the specified voltage.

As the EVR provides the supply voltage, the voltage present on a supply voltage node within the IC is monitored (block 810). The supply voltage node is the node to which the supply voltage is provided by the EVR and from which power is received by the load circuit. It is noted that while the embodiment shown herein discusses monitoring the supply voltage value, other electrical values may be monitored in other embodiments. For example, embodiments are possible and contemplated where rates of change of current and/or voltage is monitored.

If a voltage droop is detected (block 815, yes), the SIVR will provide current to the load circuit for a finite duration (block 820). The duration may be pre-determined in some embodiments, or may be determined on the fly in other embodiments. In either case, it is desirable that the SIVR provide current for a time that is sufficient to allow the EVR to respond to the increased current demand from the load circuit which caused the voltage droop. By providing current from the SIVR, which has much lower latency than the EVR, the gap between the current demanded by the load circuit and the instantaneous current that can be provided by the EVR may be filled. Providing current from the SIVR may also reduce the size of any voltage droop from the rapid increase in current demanded by the load, and may enable the supply voltage value to stay within its specified tolerance.

When no voltage droop is detected (block 815, no), the supply voltage continues to be provided exclusively by the EVR. Furthermore, once the SIVR has provided current for a finite duration, the EVR may resume exclusively providing the supply voltage to the load circuit of the IC.

Figure 9:
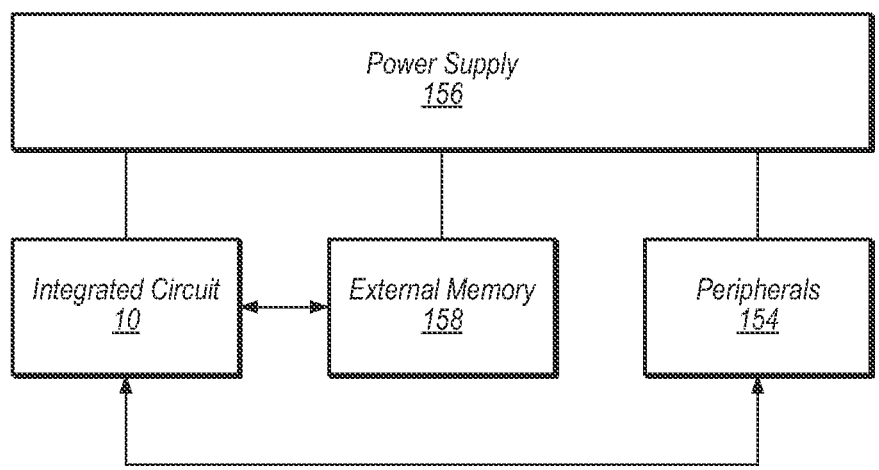
FIG. 9 is a block diagram of one embodiment of an exemplary system.

Turning next to FIG. 9, a block diagram of one embodiment of a system 150 is shown. In the illustrated embodiment, the system 150 includes at least one instance of the integrated circuit 10 coupled to external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
a load circuit; and
an internal voltage regulator coupled to the load circuit at a supply voltage node, wherein the integrated circuit further includes an input configured to provide a voltage from an external voltage regulator to the supply voltage node, wherein the internal voltage regulator is configured to provide current to the load circuit responsive to determining that an output voltage provided by the external voltage regulator is below a predetermined threshold value, the internal voltage regulator including a pulse generation circuit configured to generate a number of pulses responsive to a determination that the output voltage provided by the external voltage regulator is below the predetermined threshold value, the pulse generation circuitry including a pre-driver circuit, a pull-up transistor and a pull-down transistor coupled to an output node, wherein the pulse generation circuitry is configured to, during generation of a pulse, activate the pull-up transistor N+1 times, activate the pull-down transistor N times, and tri-state the output node at an end of the pulse, wherein N is an integer value.

2. The integrated circuit as recited in claim 1, wherein each of the internal and external voltage regulators are switching voltage regulators configured to provide respective output voltages and currents in a plurality of phases.

3. The integrated circuit as recited in claim 1, wherein a ratio of average current to peak current $\beta$ for the pulse is calculated by the formula $\beta=[N+1-\text{sqrt}(N+1)]/N$.

4. The integrated circuit as recited in claim 1, wherein the internal voltage regulator is further configured to continue supplying current until the output voltage provided by the external voltage regulator returns to a value that is equal to or greater than the predetermined threshold value.

5. The integrated circuit as recited in claim 1, wherein the internal voltage regulator comprises a direct current to direct current (DC-DC) buck regulator.

6. The integrated circuit as recited in claim 1, further comprising a finite state machine configured to cause the pulse generation circuit to generate pulses.

7. The integrated circuit as recited in claim 6, further comprising a comparator configured to compare the output voltage provided by the external voltage regulator to a predetermined threshold voltage, and further configured to assert a comparison signal responsive to determining that the output voltage is less than the predetermined threshold voltage.

8. The integrated circuit as recited in claim 7, wherein the finite state machine is configured to begin generating pulses responsive to assertion of the comparison signal.

9. A method comprising:
providing a voltage to a load circuit implemented on an integrated circuit (IC) from a first voltage regulator implemented external to the IC;
providing current to the load circuit from a second voltage regulator implemented on the IC responsive to determining that the voltage provided by the first voltage regulator is below a threshold value, wherein providing the current includes generating, by the pulse generating circuitry, a number of pulses to a supply voltage node on the IC by activating in an alternating sequence a pull-up transistor and a pull-down transistor each coupled to an output node, wherein generating a pulse comprises the pulse generating circuitry activating the pull-up transistor N+1 times and the pull-down transistor N times during generation of the pulse, wherein N is an integer value, wherein outputs of both the first and second voltage regulators are coupled to the supply voltage node; and
the second voltage regulator discontinuing providing current to the load circuit when the voltage is greater than or equal to the threshold value, wherein discontinuing providing current to the load circuit from the second voltage regulator comprises the pulse generating circuitry tri-stating the output node.

10. The method as recited in claim 9, wherein N is based on a ratio of average output current output by the pulse generating circuitry to peak current output by the pulse generating circuitry.

11. The method as recited in claim 9, further comprising:
a comparator comparing the voltage provided by the first voltage regulator to a threshold value; and
asserting a comparison signal responsive to determining that the voltage provided by the first voltage regulator is less than the threshold value.

12. The method as recited in claim 11, further comprising:

responsive to receiving an asserted comparison signal at a finite state machine, causing, using the finite state machine, the pulse generating circuit to generate pulses.

13. A system comprising:

a first voltage regulator; and an integrated circuit (IC) including a load circuit and a second voltage regulator, wherein the first voltage regulator is external to the IC, wherein the load circuit is coupled to the first and second voltage regulators at a supply voltage node, wherein the second voltage regulator is configured to provide current to the load circuit when a voltage provided by the first voltage regulator is below a specified value, wherein the second voltage regulator includes pulse generating circuitry configured to generate pulses when the voltage provided by the first voltage regulator is below a specified value, wherein the pulses are provided to the load circuit via the supply voltage node, wherein the pulse generating circuitry includes:

a finite state machine configured to cause pulses to be generated;

a predriver circuit coupled to receive control signals from the finite state machine;

a pull-up transistor coupled to the pre-driver circuit and a pull-down transistor coupled to the pre-driver circuit, wherein the pull-up and pull-down transistors are each coupled to drive an output node.

14. The system as recited in claim 13, wherein the pre-driver circuit is configured to cause generation of a pulse by alternately activating the pull-up and pull-down transistors responsive to generation of control signals caused by the finite state machine.

15. The system as recited in claim 13, wherein the first and second voltage regulators comprise switching voltage regulators each configured to provide a respective output voltage in a plurality of phases.

16. The system as recited in claim 13, wherein the first and second voltage regulators comprise multi-phase direct current to direct current (DC-DC) buck converters.

17. The system as recited in claim 13, further comprising a comparator configured to compare the voltage provided by the first voltage regulator to the specified voltage, and further configured to assert a signal responsive to determining that the voltage provided by the first voltage regulator is less than the specified voltage.

18. The system as recited in claim 17, wherein the finite state machine is coupled to receive the signal from the comparator, wherein responsive to the comparator asserting the signal, the finite state machine is configured to cause the pulse generating circuitry to begin generating pulses.

19. The system as recited in claim 13, wherein the pulse generation circuitry is configured to, during generation of a pulse, activate the pull-up transistor $N+1$ times, activate the pull-down transistor $N$ times, and tri-state the output node at an end of the pulse, wherein $N$ is an integer value.

20. The system as recited in claim 19, wherein a ratio of average current to peak current $\beta$ for the pulse is calculated by the formula $\beta = [N+1-\mathrm{sqrt}(N+1)/]N$.

* * * * *